United States Patent
Bayley et al.

[19]

[11] Patent Number: 6,102,436

[45] Date of Patent: Aug. 15, 2000

[54] VEHICLE ROOF STRUCTURE WITH MOTORIZED DEPLOYMENT ASSEMBLY FOR RESTRAINING A VEHICLE OCCUPANT

[75] Inventors: Gregory S. Bayley, Dryden; Paul A. Bowers, Ray, both of Mich.

[73] Assignee: TRW Vehicle Safety Systems Inc., Lyndhurst, Ohio

[21] Appl. No.: 09/132,337

[22] Filed: Aug. 11, 1998

[51] Int. Cl.⁷ .................................................. B60R 21/04
[52] U.S. Cl. ...................... 280/753; 280/748; 280/751; 296/214
[58] Field of Search ................... 280/748, 751, 280/753; 296/214, 39.1

[56] References Cited

U.S. PATENT DOCUMENTS

| | | | |
|---|---|---|---|
| 3,188,112 | 6/1965 | Oelkrug | 280/150 |
| 3,814,459 | 6/1974 | Eckels | 280/753 |
| 3,837,422 | 9/1974 | Schlanger . | |
| 4,275,919 | 6/1981 | Okamoto et al. . | |
| 4,600,621 | 7/1986 | Maurer et al. . | |
| 4,906,020 | 3/1990 | Haberer . | |
| 5,112,081 | 5/1992 | Kesseru . | |
| 5,265,903 | 11/1993 | Kuretake et al. . | |
| 5,333,898 | 8/1994 | Stutz . | |
| 5,433,477 | 7/1995 | Kraus . | |
| 5,462,308 | 10/1995 | Seki et al. . | |
| 5,496,066 | 3/1996 | Hoffmann et al. | 280/753 |
| 5,660,414 | 8/1997 | Karlow et al. . | |
| 5,775,726 | 7/1998 | Timothy et al. | 280/730.1 |
| 5,845,458 | 12/1998 | Alstrin et al. | 123/635 |

*Primary Examiner*—Brian L. Johnson
*Assistant Examiner*—Deanna Draper
*Attorney, Agent, or Firm*—Tarolli, Sundheim, Covell, Tummino & Szabo L.L.P.

[57] ABSTRACT

An apparatus includes a vehicle roof structure (12) and a motorized deployment assembly (40, 42). The roof structure (12) includes a roof panel (14) and a head liner (16) which conceals the roof panel (14) from view in a vehicle occupant compartment (17). The motorized deployment assembly (40, 42) is operatively engaged with the head liner (16), and is actuatable to move the head liner (16) downward away from the roof panel (14) to a deployed position in which the head liner (16) can restrain movement of a vehicle occupant upward toward the roof panel (14). The apparatus further includes means (44, 46) for sensing and responding to a vehicle crash by actuating the motorized deployment assembly (40, 42).

14 Claims, 4 Drawing Sheets

VEHICLE ROOF STRUCTURE WITH MOTORIZED DEPLOYMENT ASSEMBLY FOR RESTRAINING A VEHICLE OCCUPANT

FIELD OF THE INVENTION

The present invention relates to an apparatus for restraining a vehicle occupant upon the occurrence of a crash, and particularly relates to vehicle roof structure for restraining upward movement of a vehicle occupant.

BACKGROUND OF THE INVENTION

When a vehicle experiences a crash, crash forces may tend to move an occupant of the vehicle within the vehicle occupant compartment. Such crash forces may tend to move an occupant upward toward the vehicle roof.

SUMMARY OF THE INVENTION

In accordance with the present invention, an apparatus comprises a vehicle roof structure and a motorized deployment assembly. The roof structure comprises a roof panel and a head liner which conceals the roof panel from view in a vehicle occupant compartment. The motorized deployment assembly is operatively engaged with the head liner, and is actuatable to move the head liner downward away from the roof panel to a deployed position in which the head liner can restrain movement of a vehicle occupant upward toward the roof panel. The apparatus further comprises means for sensing and responding to a vehicle crash by actuating the motorized deployment assembly.

BRIEF DESCRIPTION OF THE DRAWINGS

The foregoing and other features of the present invention will becomes apparent to one skilled in the art to which the present invention relates upon reading the following description with reference to the accompanying drawings, wherein.

DESCRIPTION OF A PREFERRED EMBODIMENT

Figure 1:
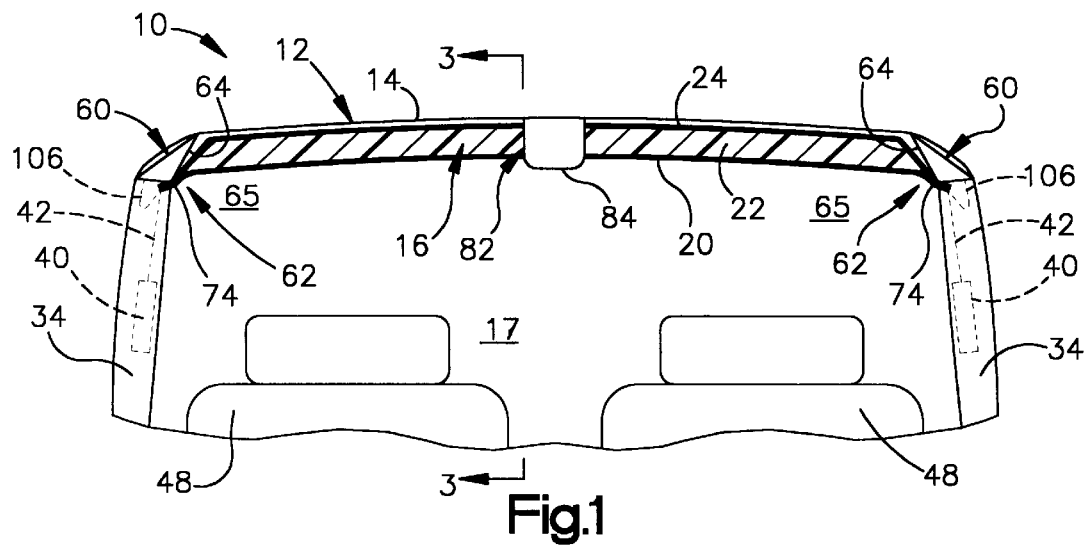
FIG. 1 is a partial view of a vehicle comprising a preferred embodiment of the present invention, with certain parts being shown schematically.
Figure 2:
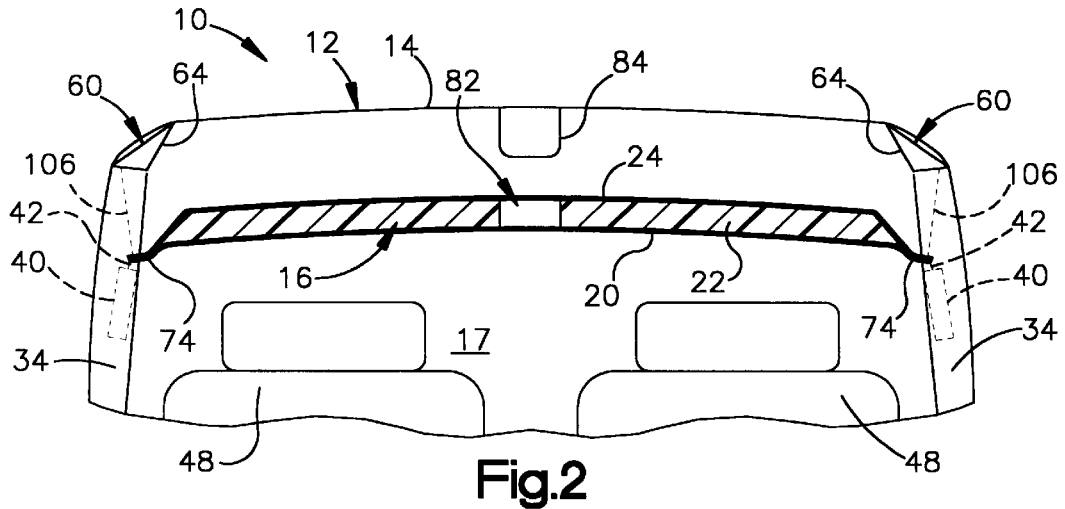
FIG. 2 is a view similar to FIG. 1 showing parts in different positions.

A vehicle 10 comprising a preferred embodiment of the present invention is shown partially in FIG. 1. The vehicle 10 has a roof structure 12 including a roof panel 14 and a head liner 16. The head liner 16 extends over the occupant compartment 17 beneath the roof panel 14 to conceal the roof panel 14 from view in the occupant compartment 17. In accordance with the present invention, the head liner 16 is deployed downward away from the roof panel 14, as shown in FIG. 2, upon the occurrence of a vehicle crash. The head liner 16 can then restrain movement of one or more vehicle occupants upward toward the roof panel 14 to help protect the occupants from a forceful impact with the roof panel 14 as a result of the crash.

The head liner 16 in the preferred embodiment of the present invention includes an outer layer 20 on a compressively deflectable base 22. The outer layer 20 is preferably formed of fabric. The base 22 is preferably formed of elastomeric foam. The head liner 16 further has a substrate layer 24 which is preferably formed of plastic.

Figure 3:
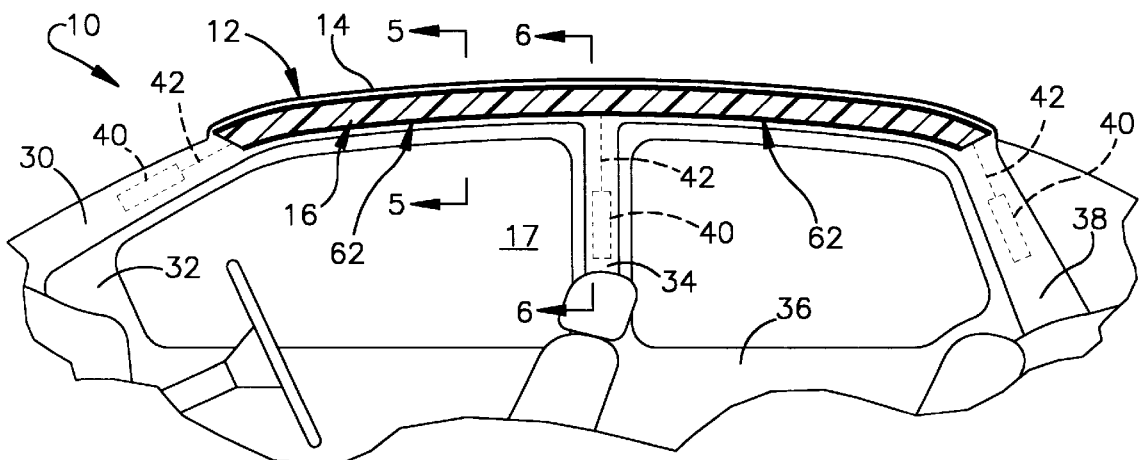
FIG. 3 is a view taken on line 3—3 of FIG. 1.

As shown in FIG. 3, the vehicle 10 is a four door passenger car. Each side of the car 10 has an A pillar 30 at the forward end of the front door 32, a B pillar 34 between the front and rear doors 32 and 36, and a C pillar 38 at the rear end of the rear door 36. Each of the pillars 30, 34 and 38 contains a motor 40 and a tether 42 connecting the motor 40 with the head liner 16.

Figure 4:
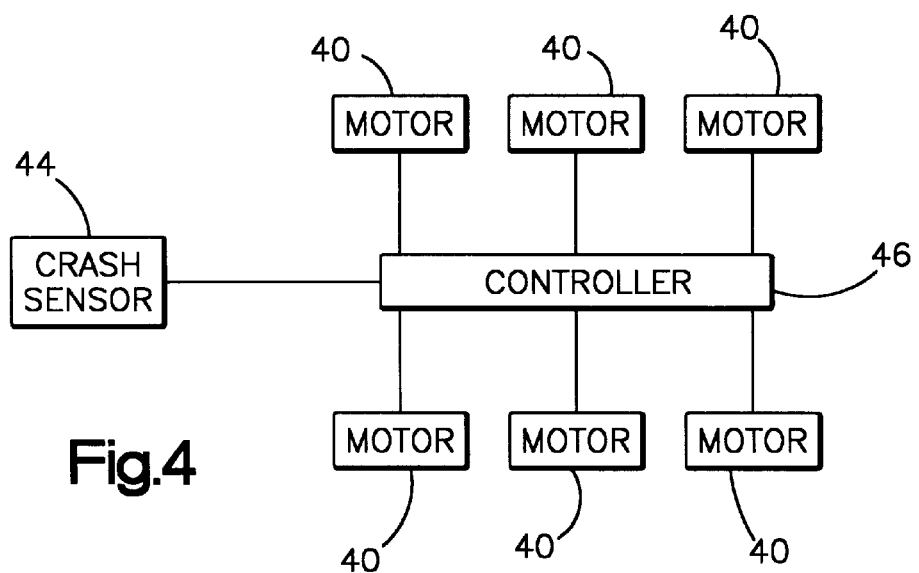
FIG. 4 is a block diagram of parts of the preferred embodiment of the invention.

The motors 40 are operatively interconnected with a crash sensor 44 (FIG. 4) and an electronic controller 46. The crash sensor 44 is a known device that senses vehicle conditions indicating the occurrence of a crash. The conditions sensed by the crash sensor 44 preferably comprise conditions that indicate the occurrence of a rollover crash. Such a crash-indicating condition may meet or exceed a predetermined threshold level of severity. If so, the controller 46 responds by actuating the motors 40. The motors 40 then pull the tethers 42 downward to pull the head liner 16 downward away from the roof panel 14 from the position of FIG. 1 to the position of FIG. 2. Since this may occur when the vehicle is overturning in a rollover crash, movement "downward" in the context of the present invention means movement in the occupant compartment 17 in a direction from the roof panel 14 toward the vehicle seats 48.

As shown schematically in FIGS. 1 and 2, the roof structure 12 further includes a roof rail 60. The roof rail 60 extends around the periphery of the roof structure 12, and has a generally triangular cross-sectional configuration. When the head liner 16 is in the position of FIG. 1, it is releasably interconnected with the roof panel 14 by a plurality of elongated joints 62 that extend along the roof rail 60. For example, the roof rail 60 has a pair of opposite side sections 64 adjacent to the upper corner regions 65 of the occupant compartment 17 at opposite sides of the vehicle 10. The adjacent joints 62 connect the head liner 16 releasably to those side sections 64 of the roof rail 60 in the manner shown in FIG. 5.

Figure 5:
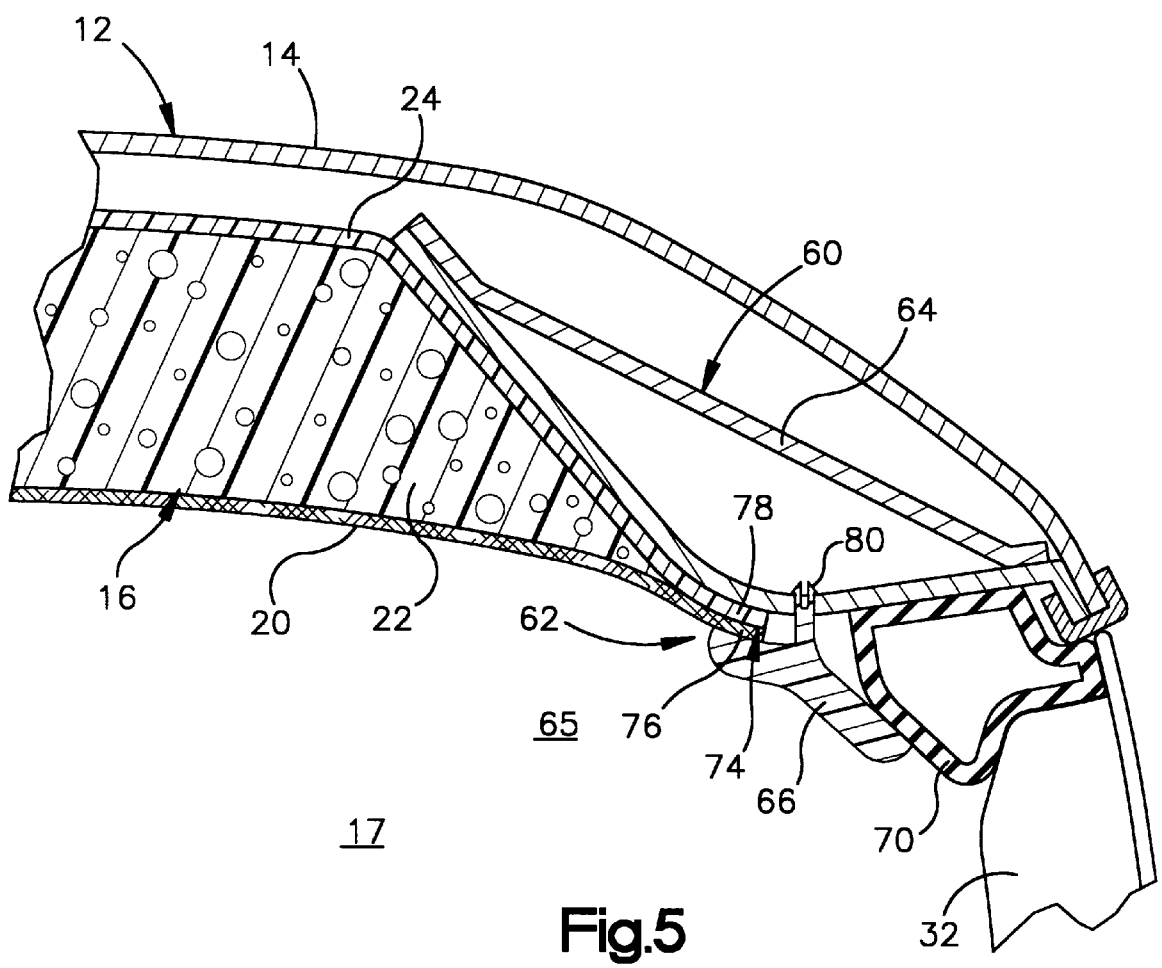
FIG. 5 is a view taken on line 5—5 of FIG. 3.

The joint 62 of FIG. 5 is defined in part by the side section 64 of the roof rail 60 and in part by a plastic moulding strip 66. The moulding strip 66 is mounted on the side section 64 of the roof rail 60 beside a seal 70 for the adjacent door 32. A peripheral edge portion 74 of the head liner 16 is defined by overlapping peripheral edge portions 76 and 78 of the outer layer 20 and the substrate layer 24, respectively. The edge portion 74 of the head liner 16 is clamped between the moulding strip 66 and the side section 64 of the roof rail 60. Although the moulding strip 66 in the preferred embodiment of the invention is connected to the roof rail 60 by locking tab portions 80 of the moulding strip 66, any other suitable fastening structures could be used as alternatives. In each case, the moulding strip 66 is fastened to the roof rail 60 tightly enough for the edge portion 74 of the head liner 16 to remain clamped firmly between the moulding strip 66 and the roof rail 60 during ordinary vehicle operating conditions.

The substrate layer 24 of the head liner 16 is preferably rigid enough to support the base 22 and the outer layer 20 fully between the joints 62 at the roof rail 60 without flexing. This enables the head liner 16 to span the occupant compartment 17 beneath the roof panel 14 without being connected directly to the roof panel 14 at locations spaced laterally from the joints 62. However, the head liner 16 is provided with a cutout 82 for a lighting fixture 84 (FIGS. 1 and 2) which is mounted on the roof panel 14, and is connected indirectly to the roof panel 14 by a releasable interference fit with the lighting fixture 84.

The edge portion 74 of the head liner 16 is not connected directly to the roof rail 60 at the locations of the A, B and C pillars 30, 34 and 38. Instead, the edge portion 74 of the head liner 16 is connected with the motors 40 and the tethers 42 at those locations. This is shown by way of example in FIG. 6.

Each motor 40 in the preferred embodiment is a linear actuator comprising a housing 90 and a shaft 92 projecting from the housing 90. The shafts 92 are drawn longitudinally inward of the housings 90 upon actuation of the motors 40. The motors 40 may thus comprise, for example, pneumatic or hydraulic motors, solenoids, and/or pyrotechnically driven piston/cylinder assemblies. Each motor 40 is supported within the corresponding pillar 30, 34 or 38 by a pivotal mounting structure 94.

Each tether 42 in the preferred embodiment is a strap of seat belt webbing material. A fastener 96 attaches an upper end portion 98 of the tether 42 to the edge portion 74 of the head liner 16. A stitched seam 100 fastens a lower end portion 102 of the tether 42 in a loop around a D-ring 104 on the corresponding shaft 92. An additional tether 106 also has an end portion 108 attached to the head liner 16 by the fastener 96. An opposite end portion 110 of the additional tether 106 is attached to the roof rail 60 by another fastener 112.

Figure 6:
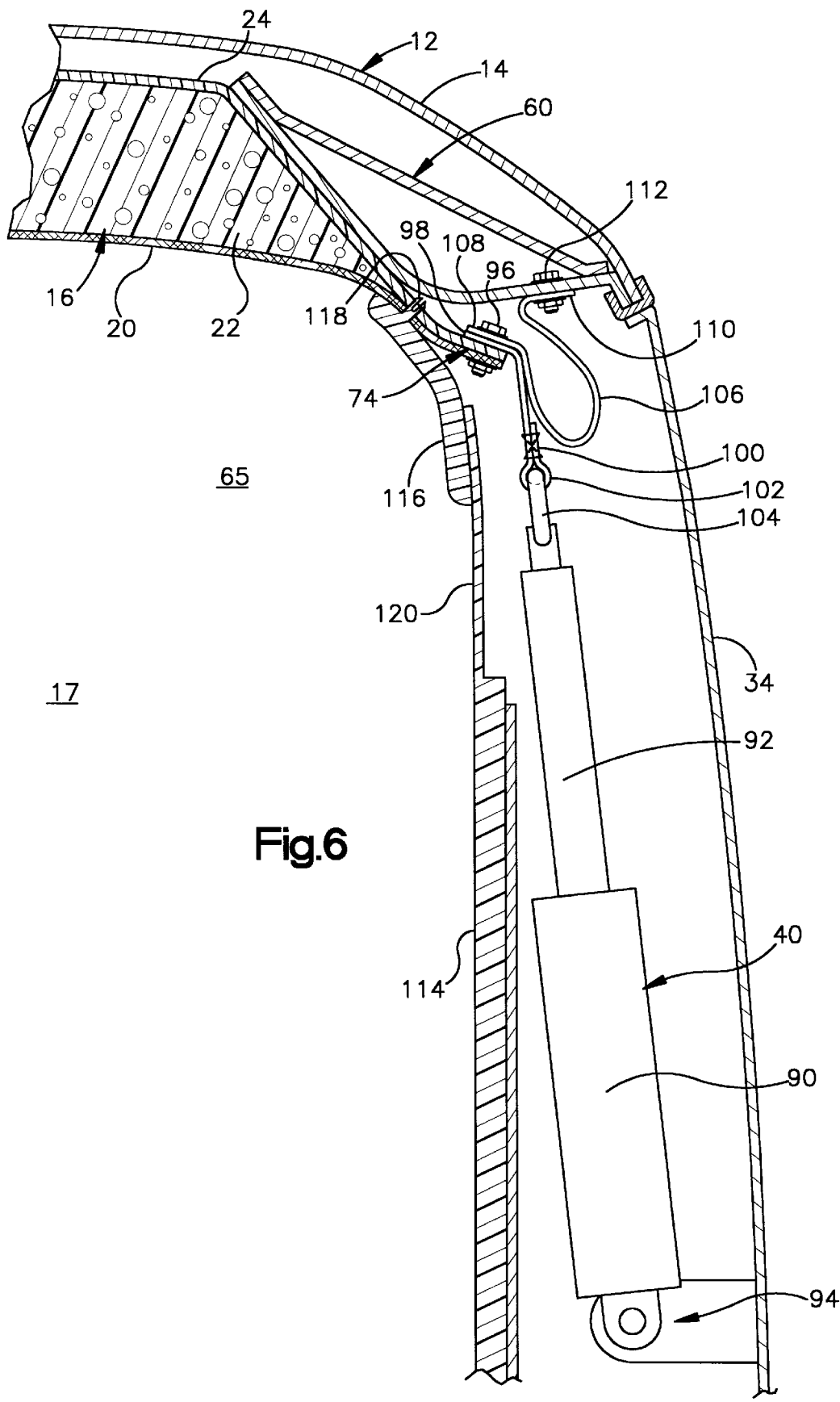
FIG. 6 is a view taken on line 6—6 of FIG. 3.

As further shown by way of example in FIG. 6, each of the pillars 30, 34 and 38 is covered by a plastic trim structure 114 and a plastic moulding strip 116. The moulding strips 116 at the trim structures 114 are separate from the moulding strips 66 at the joints 62 (FIG. 5). Moreover, the moulding strips 116 at the trim structures 114 have locking tab portions 118 that are interlocked with the edge portion 74 of the head liner 16. Each trim structure 114 has a thin, break-away portion 120 extending downward from the corresponding moulding strip 116.

Figure 7:
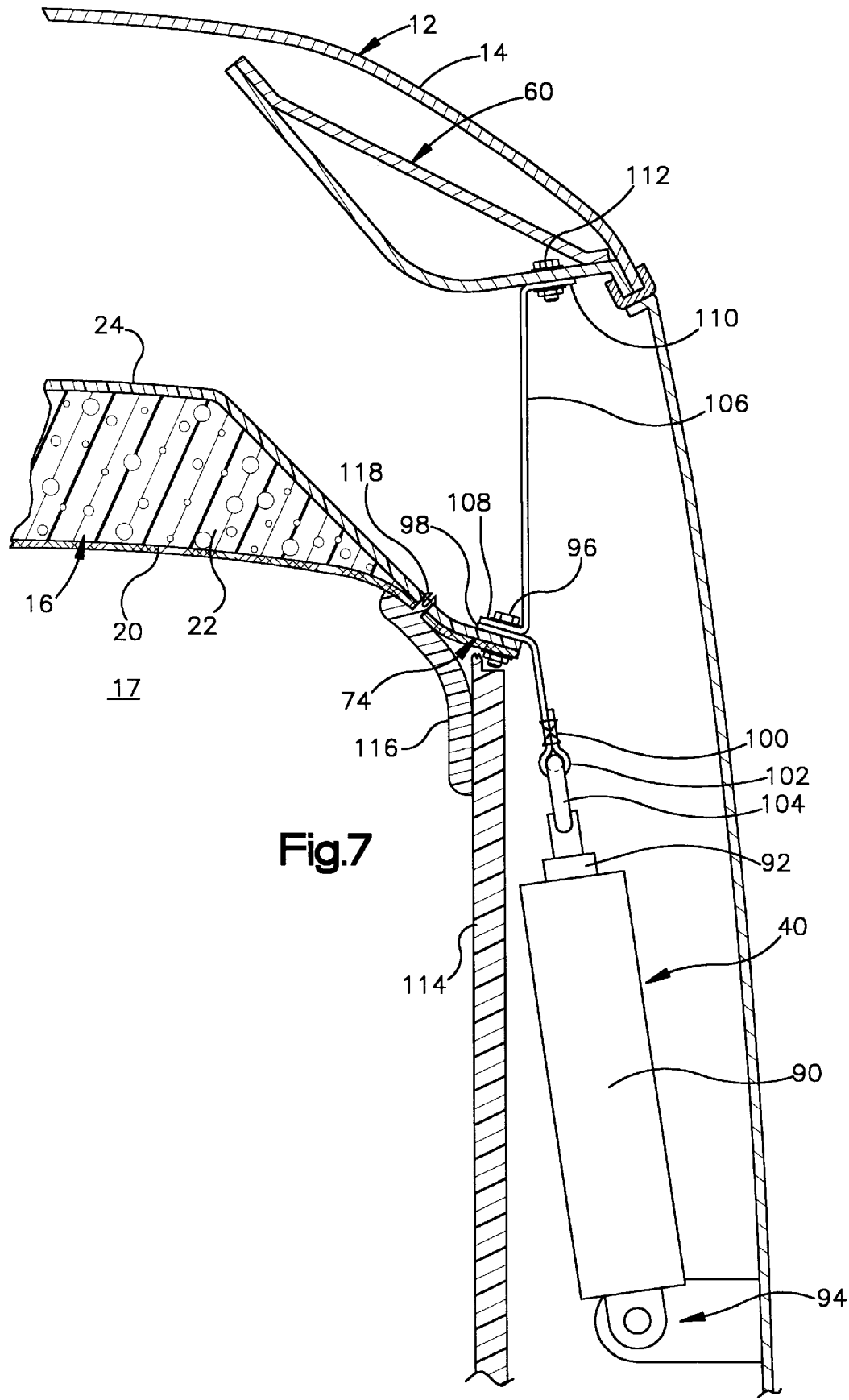
FIG. 7 is a view similar to FIG. 6 showing parts in different positions.

As noted above, the shafts 92 are drawn longitudinally inward of the housings 90 when the motors 40 are actuated. Each shaft 92 is thus moved from an extended position, as shown in FIG. 6, to a retracted position, as shown in FIG. 7. The retracting shafts 92 pull the tethers 42 downward so as to pull the head liner 16 downward away from the roof panel 14 from the position of FIG. 1 to the position of FIG. 2.

When the head liner 16 is being pulled downward by the tethers 42 in the pillars 30, 34 and 38, the tension applied to the edge portion 74 of the head liner 16 pulls the edge portion 74 outward from between the moulding strips 66 and the roof rail 60 at the releasable joints 62 (FIG. 5). The break-away portions 120 of the trim structures 114 at the pillars 30, 34 and 38 are broken away as the tethers 42, the head liner 16 and the moulding strips 116 are pulled downward relative to the trim structures 114, as shown in FIG. 7. The additional tethers 106 anchor the head liner 16 to the roof rail 60 to block further downward movement of the head liner 16, also as shown in FIG. 7. The head liner 16 is thus moved to a position spaced a predetermined distance downward from the roof panel 14.

In accordance with a particular feature of the invention, the motors 40 in the preferred embodiment continue to exert retracting forces on the shafts 92 so as to maintain tension in the tethers 42 after the head liner 16 has been moved to the position of FIG. 7. This is an over-stroke feature of the motors 40 that maintains an occupant restraining force in the head liner 16, and that also enables the head liner 16 to be pulled further downward toward the seats 48 (FIG. 2) if crash forces cause the roof rail 60 to deflect in that direction.

From the above description of the invention, those skilled in the art will perceive improvements, changes and modifications. For example, it is preferable to pull the head liner 16 downward by the use of the tethers 42 extending from the motors 40 to the head liner 16, but the motors 40 could alternatively be connected directly to the head liner 16. Moreover, the head liner 16 in the preferred embodiment of the invention is moved uniformly downward away from the roof panel 14, as indicated in FIG. 2. The present invention could alternatively be used to move a head liner downward away from a roof panel in an orientation that is inclined toward one or more selected occupant positions in a vehicle occupant compartment. This could be accomplished in the preferred embodiment by having the controller 46 actuate the motors 40 sequentially and/or with retraction strokes or rates that would cause the tethers 42 to pull the head liner 16 downward away from the roof panel 14 in an orientation other than that shown in FIG. 2. Such improvements, changes and modifications within the skill of the art are intended to be covered by the appended claims.

Having described the invention, the following is claimed:

1. Apparatus comprising:
   a vehicle roof structure comprising a roof panel and a head liner which conceals said roof panel from view in a vehicle occupant compartment;
   a motorized deployment assembly operatively engaged with said head liner, said motorized deployment assembly being actuatable to move said head liner downward away from said roof panel to a deployed position in which said head liner can restrain movement of a vehicle occupant upward toward said roof panel; and
   actuating means for sensing and responding to a vehicle crash by actuating said motorized deployment assembly.

2. Apparatus as defined in claim 1 wherein said head liner is supported for movement uniformly downward away from said roof panel under the influence of said motorized deployment assembly.

3. Apparatus as defined in claim 1 wherein said head liner has peripheral edge portions at upper corner regions of said vehicle occupant compartment, said roof structure further comprising elongated joints along which said peripheral edge portions of said head liner are interconnected with said roof panel, said peripheral edge portions of said head liner being disengageable from said joints under the influence of said motorized deployment assembly.

4. Apparatus as defined in claim 3 wherein said joints comprise moulding strips and roof rail sections extending along said upper corner regions of said occupant compartment, said peripheral edge portions of said head liner being clamped between said moulding strips and said roof rail sections and being movable outward from between said moulding strips and said roof rail sections under the influence of said motorized deployment assembly.

5. Apparatus as defined in claim 1 wherein said head liner comprises a compressively deflectable structure on a rigid substrate.

6. Apparatus as defined in claim 1 wherein said actuating means includes means for sensing and responding to a rollover vehicle crash by actuating said motorized deployment assembly.

7. Apparatus as defined in claim 1 wherein said motorized deployment assembly is actuatable to pull said head liner downward to said deployment position.

8. Apparatus as defined in claim 7 wherein said motorized deployment assembly includes motors and tethers, said tethers being connected between said motors and said head liner to pull said head liner downward away from said roof panel upon actuation of said motors.

9. Apparatus as defined in claim 8 wherein said motorized deployment assembly further includes additional tethers connected between said head liner and said roof panel to limit movement of said head liner downward away from said roof panel under the influence of said motors.

10. Apparatus as defined in claim 8 wherein said motors comprise linear actuators.

11. Apparatus as defined in claim 8 wherein said tethers comprise straps of seat belt webbing material.

12. Apparatus comprising:

a vehicle roof panel;

a head liner which conceals said roof panel from view in a vehicle occupant compartment; and actuating means for sensing and responding to a vehicle crash and for breaking said head liner away from said roof panel to help restrain movement of a vehicle occupant upward toward said roof panel.

13. Apparatus as defined in claim 12 wherein said actuating means includes means for sensing and responding to a rollover vehicle crash by moving said head liner downward away from said roof panel.

14. Apparatus as defined in claim 12 wherein said actuating means includes means for sensing and responding to a rollover vehicle crash and for breaking said head liner away from said roof panel.

* * * * *

UNITED STATES PATENT AND TRADEMARK OFFICE
CERTIFICATE OF CORRECTION

PATENT NO.   : 6,102,436
DATED        : August 15, 2000
INVENTOR(S)  : Gregory S. Bayley et al.

It is certified that error appears in the above-identified patent and that said Letters Patent is hereby corrected as shown below:

Column 6,
Line 9, delete "by moving said head liner downward away from said roof panel" and insert -- and for breaking said head liner away from said roof panel --.
Line 12, delete "sensing and responding to a rollover vehicle crash and for breaking said head liner away" and insert -- anchoring said head liner to said roof panel to limit movement of said head liner to a position spaced a predetermined distance downward --.

Signed and Sealed this

Thirtieth Day of April, 2002

Attest:

JAMES E. ROGAN
Attesting Officer     Director of the United States Patent and Trademark Office